3,519,219
TAPE MEASURE CONSTRUCTION INCORPORATING A TAPE HOOK BUMPER
Charles Zelnick, Saginaw, Mich., assignor, by mesne assignments, to Cooper Industries, Inc., Houston, Tex., a corporation of Ohio
Filed July 19, 1967, Ser. No. 654,468
Int. Cl. B65b 75/16, 75/48
U.S. Cl. 242—84.8                   15 Claims

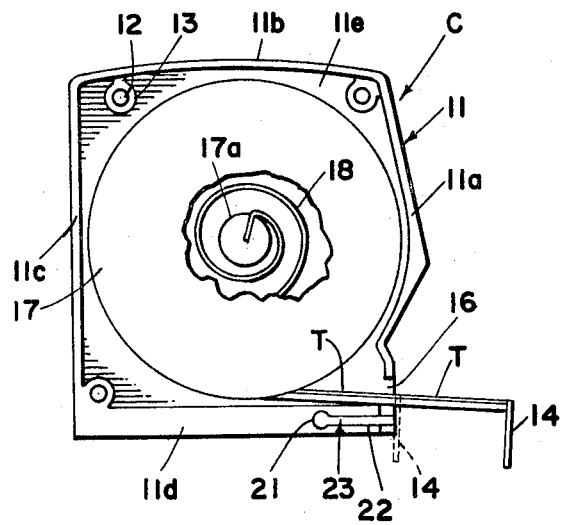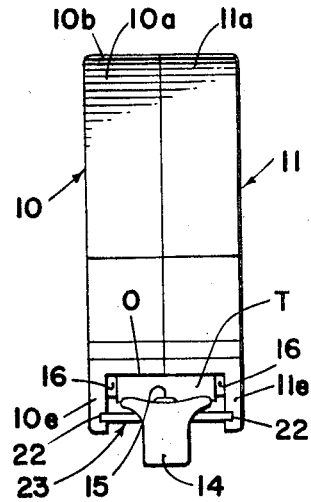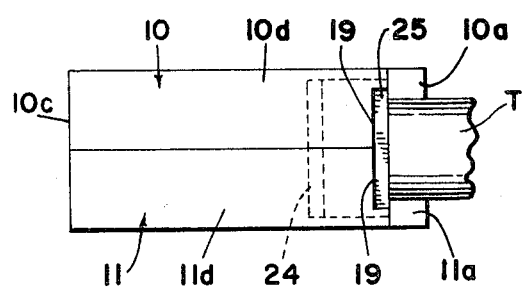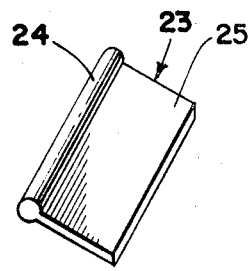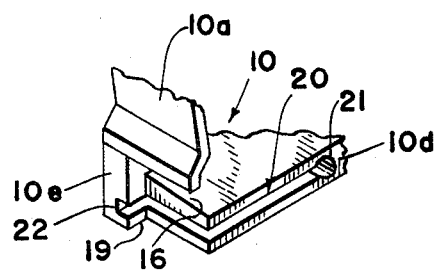
INVENTOR.
CHARLES ZELNICK
BY
Learman, Learman & McCulloch United States Patent Office 3,519,219
Patented July 7, 1970

ABSTRACT OF THE DISCLOSURE

A tape measure construction comprising: a tape casing formed of a pair of mating sections having aligned slots forming a frontal tape opening therein; a tapeline coiled in the casing and having a free end with a tape hook thereon extending out the opening; a resilient bumper mounted in parallel slots in the casing sections in a position to be engaged by the tape hook on the end of the tapeline before the tape hook can engage the measuring tape casing.

---

The stress wound return springs utilized in contemporary automatic return tape measures have considerable torque and one of the problems which has been encountered in using such tape measures is the gradual destruction of the leading end of the tapeline by the constant hammering it receives as it is retrieved into the casing. Such tape measures are provided with an automatic return button which, if properly manipulated, may be operated to return the tape to the casing at a controlled speed which will avoid the problem. However, the fact is that many users do not properly manipulate the tape return button, or have no interest in doing so, with the result that the button is held in the depressed position until the entire tape is reurned to the casing a full speed and the tape hook slams into the casing under the force of the full torque produced by the return spring. The hook, under this impact, will quite often bend; however, more importantly the shear load applied to the hook rivet will tend to tear the rivet loose. When a sudden stress is applied to such relatively thin tape rules at the rivet holes, there is also a tendency for the tapeline to split in the rivet area.

One of the prime objects of the present invention is to provide a tape measure having a resilient bumper member mounted in a position to absorb a large percentage of the impact load and cushion the shock of the returning hook so that the tape measure is not destroyed in a relatively short time even by inexperienced or careless users.

Another object of the invention is to provide a tape bumper construction in a measuring tape which is so configured relative to mounting means provided in the tape measure casing that it need not be fastened in position but is held securely in position by the assembled casing sections.

A further object of the invention is to provide a tape measure of the character described which can be economically produced and yet is of highly reliable and durable construction.

Other objects and advantages of the invention will be pointed out specifically or will become apparent from the following description when it is considered in conjunction with the appended claims and the accompanying drawings, in which:

In the drawings, FIG. 1 is a side elevational view of the tape measure with one of the side sections removed to expose the interior thereof;

FIG. 2 is a front elevational view of an assembled tape measure;

FIG. 3 is an inverse plan view;

FIG. 4 is a perspective plan view of a bumper element;

FIG. 5 is a fragmentary perspective elevational view of one of the casing sections more particularly illustrating the frontal groove in which the bumper element is received.

Referring now more particularly to the accompanying drawings, wherein I have shown a preferred embodiment of the invention only, the numerals 10 and 11 generally indicate preferably die cast tape casing side sections which respectively include front walls 10a and 11a, top walls 10b and 11b, rear walls 10c and 11c, bottom walls 10d and 11d, and side walls 10e and 11e. Threaded openings 12 may be provided in eye members 13 provided on the casing section 11 and screws (not shown) may be utilized in the usual manner to extend through openings in the casing section 10 into the openings 12 to secure the casing sections 10 and 11 in mated relation.

A tapeline generally designated T and having a tape hook 14 riveted thereto as at 15 in the usual manner may be withdrawn from the tape casing generally designated C through a tape opening O formed by slots 16 provided in each casing section front wall 10a and 11a. The tapeline T is wound on a tape drum 17 which is powered by the usual return spring 18. It will be observed that the tape hook 14 is less in width than the frontal tape opening O formed by the aligned slots 16 provided in the casing section front walls 10a and 11a, and it will also be observed that it is less in width than the recess 19 (see FIG. 3) formed by relieving the bottom walls 10d and 11d of the mating casing sections 10 and 11.

Formed in the lower walls 10d and 11d of the casing sections, beneath the opening generally designated O and generally parallel therewith, is a bumper receiving slot generally designated 20 and comprising a curvilinear rear portion 21 and a frontal portion 22 of decreased thickness relative to the curvilinear portion 21. The portions 21 and 22 provided in the bottom walls 10d and 11d of each casing section extend also into the side wall sections 10e and 11e as particularly shown in FIG. 5. The resilient bumper element generally designated 23, which may be formed of a rubber of suitable durometer, includes an enlarged bead portion 24 received in the curvilinear recess portion 21 of each of the casing section lower walls 10d and 11d and a flat sheet portion 25 which extends forwardly beyond the relieved portions 19 of the lower walls 10d and 11d.

To assemble the bumper element 23 in the casing is a relatively easy task which does not add to the cost of manufacturing the tape casing in a material way. With the casing sections 10 and 11 apart, the bumper element 23 is inserted into one of the slots 20 and then the other casing section 11 is fitted to it with the bumper element 23 receiving its identical and horizontally aligned slot 20. The bumper elements 23 are easily formed as an extruded rubber strip which may be then cut into individual bumpers 23.

In operation, when the tapeline T has been extended from the casing C and the spring return button is pressed to withdraw it into the casing C through the opening 16, the hook 14 is prevented from engaging the casing C by the bumper 23. The bumper 23 absorbs the impact of the returning tapeline and does not transmit the shock to the extent there is any tendency to inadvertently drop the tape measure.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:
1. In a measuring tape construction: a casing comprising mating side sections in assembled relation and having a frontal tape opening therein; a tapeline coiled in said casing and having a leading end extending out said opening; tape hook means on said end extending angularly to prevent said end from being drawn fully into said casing means; motor means within said casing means operable for withdrawing said tapeline into said casing means except for said tape hook means; recess means opening frontally through said casing means in juxtaposed adjacent relation with said tape opening; and resilient bumper means disposed in said recess means in extended position relative to said tape opening to engage said hook and prevent it from slamming against said casing means when the motor means is operating to retract said tapeline.

2. The combination defined in claim 1 in which said recess means is generally parallel to said tape opening and has an enlarged portion spaced rearwardly of its said open end; said bumper comprising a strip having an enlarged portion received in said enlarged portion and retaining said bumper in the recess means.

3. The combination defined in claim 2 in which said casing side sections comprise shells with mating front, rear, lower and upper edge wall portions joined to side wall portions; said recess means comprising communicating slots formed in the lower wall portion of each shell.

4. The combination defined in claim 3 in which said slots extend beyond said lower wall portions and into the side wall portions of each shell and said side wall portions extend forwardly of said lower wall portions and have slot portions supporting the frontal side edges of said bumper strip.

5. In a measuring tape construction: a casing assembly including a casing with a tape opening therein and a tapeline coiled in said casing and having a leading end extending out said opening; a retaining tape hook on said end extending angularly to the tapeline and operable to prevent said end from being drawn fully into said casing; retracting means incorporated with said casing assembly operable for withdrawing said tapeline into said casing except for said tape hook; and resilient bumper means supported by the casing assembly in opposed relation with said hook, out of an interfering position with the path of travel of the tapeline, to prevent said hook from slamming against said casing when the retracting means is operating to retract said tapeline into said tape opening.

6. The combination defined in claim 5 in which said bumper means comprises a rubber body which is stationarily mounted to prevent its retraction as a body when it is engaged sharply by said hook.

7. The combination defined in claim 5 in which said bumper means is mounted by said casing confined within said tape opening.

8. The combination defined in claim 5 in which said tape opening is generally rectangular in shape, and said bumper means is in superposed relation with said tape opening and does not project substantially beyond a flush position with the walls of the casing defining the tape opening.

9. The combination defined in claim 5 wherein said casing is made up of a pair of mating portions with aligned grooves, and said bumper means spans and is removably received by said groove in each portion.

10. In a measuring tape construction: a casing assembly comprising a casing incorporating a front wall portion and a bottom wall portion, the front wall portion having a frontal tape opening therein adjacent to said bottom wall; said assembly also including a tapeline coiled in said casing and having a leading end extending out said opening; a retaining tape hook on said end extending downwardly angularly to the tapeline and operable to prevent said end from being drawn fully into said casing; retracting means within said casing operable for withdrawing said tapeline into said casing except for said tape hook; and resilient bumper means supported by the casing below the tape opening in opposed relation with said hook to prevent said hook from slamming against said casing when the retracting means is operating to retract said tapeline into said tape opening.

11. The combination defined in claim 10 in which said bottom wall portion forms a tape guiding ramp and said bumper means extends therefrom and forms an extension thereof.

12. The combination defined in claim 11 in which said bottom wall portion is recessed inwardly with respect to said tape opening to permit said bumper means to extend therefrom.

13. The combination defined in claim 11 in which said ramp is slotted to receive said bumper means.

14. The combination defined in claim 13 in which said slot has an enlarged portion rearward of the front portion thereof, and said bumper comprises a rubber blade with a bead received in the said enlarged portion and preventing movement of said bumper as a body.

15. The combination defined in claim 10 in which said bumper means comprises a rubber body with a front portion supported only at its side edges.

References Cited
UNITED STATES PATENTS

| | | | |
|---|---|---|---|
| 1,069,593 | 8/1913 | Weaver et al. | 242—84.8 |
| 2,132,202 | 10/-938 | Carlson | 242—84.8 |

NATHAN LOUIS MINTZ, Primary Examiner

U.S. Cl. X.R.

242—107.2